E. W. Skinner,
Journal Box.
No. 88,333.   Fig. 1.   Patented Mar. 30, 1869.
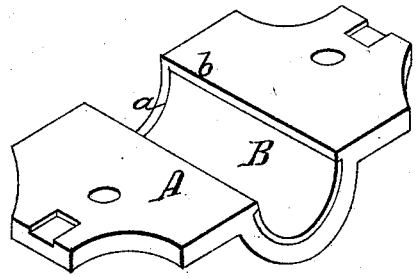
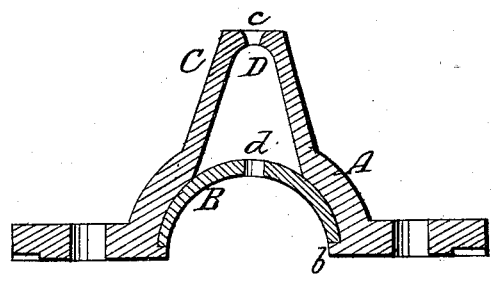
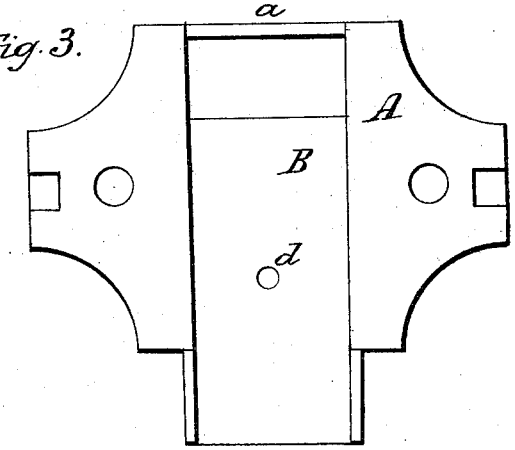
Witnesses.
P. T. Dodge.
Jno. Johnson.
Inventor.
E. W. Skinner.
by Dodge & Munn
his Attys.

E. W. SKINNER, OF MADISON, WISCONSIN.

Letters Patent No. 88,333, dated March 30, 1869.

IMPROVED JOURNAL-BOX.

The Schedule referred to in these Letters Patent and making part of the same.

*To all whom it may concern:*

Be it known that I, E. W. SKINNER, of Madison, in the county of Dane, and State of Wisconsin, have invented certain new and useful Improvements in Journal-Boxes; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to journal-bearings for reapers, harvesters, and other agricultural machines, and consists in a novel construction of the boxes.

In the drawings—

Figure 1 is a perspective view,

Figure 2 is a transverse section, and

Figure 3 is a view of the inside of one of the boxes, with brass plate partially withdrawn.

I construct my journal-box in the usual form for the bearings, as shown in fig. 1, making the body of cast-iron.

The body, A, I make in the ordinary shape, except that the recess for the journal is made larger than the journal used, and on its two sides is provided with a projecting lip, or flange, $b$, and on one end with a corresponding flange, $a$.

These lips, or flanges I make equal in their projection to the thickness of the brass, B, or other anti-friction metal plate, intended to be inserted endwise within them, and then make the brass plate D of the proper size to fit accurately into the recess, as shown in all the figures.

The plate B, I force into its place from the open end, where it is firmly held by the flanges $b$ and lip $a$.

The body, A, of the journal-box, I cast, so as to have a conical projection, C, on the outside, and a recess, or chamber, D, within it, and immediately over the centre of the brass B, which I provide with a small opening, $d$, leading from the recess D to the inside of the brass B.

The conical projection C, I also provide with a small opening, $c$, communicating with the recess D.

By this arrangement, I can place any suitable packing, or material for holding lubricating-oils within the recess D, for supplying the journals.

The oil I pour through the opening $c$, and it finds its way through the opening $d$ to the journal, and by this means I am able to keep the bearings well lubricated.

Any other suitable metal may be used instead of brass for the linings, although for reapers and other similar machines, I find brass well suited.

By this method of constructing journal-boxes, I am able to furnish agricultural machines especially with bearings that can be readily and easily removed, or replaced when worn, and which can be done by the farmer or operator himself, without sending the machine to the factory, as he can always have extra boxes ready for use. By being able to substitute promptly a sound box for one worn out or broken, the machine can be kept right on with its work.

In agricultural machines especially, where the work has to be done in its season, or loss or injury to the crop ensues, it is often a matter of great importance to be able to repair the machine at once, and on the spot.

Journal-boxes constructed in this way are not only convenient for removal and replacement, or substitution of one for another, but furnish both an anti-friction bearing for the shafting, as well as a self-lubricating arrangement. The recess, or chamber D, being supplied with a lubricating-material, it will find its way through the opening $d$ to the bearings.

Having thus described my invention,

What I claim, is—

A journal-box, consisting of the cast-iron frame A, provided with the lips $b$ and the flange $a$, in combination with the detachable brass plate B, all constructed and arranged for use substantially as and for the purpose set forth.

E. W. SKINNER.

Witnesses:
GEO. A. MASON,
HENRY CHAPPELL.